information of at least two conferee regions in the conference picture, and information of corresponding relationships between the at least two conferee regions and at least two terminals involved in the video conference; sending the information of the corresponding conferee regions to the at least two terminals; receiving conferee multimedia data provided by the at least two terminals based on the information of the corresponding conferee regions; acquiring conference video data based on the conferee multimedia data; and sending the conference video data to the at least two terminals.

(12) United States Patent
Xu et al.

(10) Patent No.: US 12,167,160 B2
(45) Date of Patent: Dec. 10, 2024

(54) METHOD, APPARATUS AND SYSTEM FOR IMPLEMENTING VIDEO CONFERENCE, AND STORAGE MEDIUM

(71) Applicant: BOE TECHNOLOGY GROUP CO., LTD., Beijing (CN)

(72) Inventors: Lirong Xu, Beijing (CN); Xiaoqin Guo, Beijing (CN); Honglei Zhang, Beijing (CN); Yangyang Zhang, Beijing (CN); Liping Lei, Beijing (CN); Wenchu Dong, Beijing (CN)

(73) Assignee: BEIJING BOE TECHNOLOGY DEVELPOMENT CO., LTD., Beijing (CN)

( * ) Notice: Subject to any disclaimer, the term of this patent is extended or adjusted under 35 U.S.C. 154(b) by 46 days.

(21) Appl. No.: 17/615,881

(22) PCT Filed: Oct. 30, 2020

(86) PCT No.: PCT/CN2020/125289
§ 371 (c)(1),
(2) Date: Dec. 2, 2021

(87) PCT Pub. No.: WO2022/088050
PCT Pub. Date: May 5, 2022

(65) Prior Publication Data
US 2022/0353434 A1    Nov. 3, 2022

(51) Int. Cl.
*H04N 5/262* (2006.01)
(52) U.S. Cl.
CPC ................................ *H04N 5/2624* (2013.01)
(58) Field of Classification Search
CPC ......... H04N 7/15; H04N 5/2624; H04N 5/262
(Continued)

(56) References Cited

U.S. PATENT DOCUMENTS

2006/0209206 A1   9/2006   Wang et al.
2016/0173824 A1   6/2016   Decker et al.
(Continued)

FOREIGN PATENT DOCUMENTS

CN    1571508 A    1/2005
CN    102111605 A  6/2011
(Continued)

OTHER PUBLICATIONS

Yang Gang, The Research of MCU in Video Conference System, Chinese Master's Theses Full-text Database Information Science and Technology Series 2011, No. 10, Oct. 15, 2011, pp. 1136-1468, Sections 5.5, 6.2.

*Primary Examiner* — Yosef K Laekemariam
(74) *Attorney, Agent, or Firm* — Lippes Mathias LLP

(57) ABSTRACT

Provided is a method for implementing a video conference. The method includes: acquiring layout information of a conference picture of the video conference, wherein the layout information comprises: information of at least two conferee regions in the conference picture, and information of corresponding relationships between the at least two conferee regions and at least two terminals involved in the video conference; sending the information of the corresponding conferee regions to the at least two terminals; receiving conferee multimedia data provided by the at least two terminals based on the information of the corresponding conferee regions; acquiring conference video data based on the conferee multimedia data; and sending the conference video data to the at least two terminals.

18 Claims, 10 Drawing Sheets

(58) Field of Classification Search
USPC .......................................... 348/14.01–14, 16
See application file for complete search history.

(56) References Cited

U.S. PATENT DOCUMENTS

| | | | |
|---|---|---|---|
| 2018/0091744 A1* | 3/2018 | Takita | .................. H04N 5/2624 |
| 2018/0241968 A1 | 8/2018 | Chen | |

FOREIGN PATENT DOCUMENTS

| | | | | |
|---|---|---|---|---|
| CN | 102387338 A | | 3/2012 | |
| CN | 102572368 | * | 7/2012 | ............... H04N 7/15 |
| CN | 102572368 A | | 7/2012 | |
| CN | 102695035 A | | 9/2012 | |
| CN | 103841359 A | | 6/2014 | |
| CN | 104038722 A | | 9/2014 | |
| CN | 107566734 A | | 1/2018 | |
| CN | 107948578 A | | 4/2018 | |
| CN | 108270989 A | | 7/2018 | |
| CN | 108462854 A | | 8/2018 | |
| CN | 108718399 A | | 10/2018 | |
| CN | 108769565 A | | 11/2018 | |
| CN | 110557599 A | | 12/2019 | |
| CN | 112788276 A | * | 5/2021 | |
| JP | 2010213133 A | | 9/2010 | |
| WO | WO-2019118852 A1 | * | 6/2019 | ......... G06F 16/3329 |

* cited by examiner

METHOD, APPARATUS AND SYSTEM FOR IMPLEMENTING VIDEO CONFERENCE, AND STORAGE MEDIUM

CROSS-REFERENCE TO RELATED APPLICATION

This application is a 371 of PCT Application No. PCT/CN2020/125289 filed on Oct. 30, 2020, the disclosure of which is incorporated herein by reference in its entirety.

TECHNICAL FIELD

The present disclosure relates to the field of network technologies, and in particular, relates to a method, apparatus and system for implementing a video conference, and a storage medium thereof.

BACKGROUND

Video conferencing is a currently emerging method for implementing a video conference, whereby many people may implement a conference on line, which is convenient and fast.

SUMMARY

Embodiments of the present disclosure provide a method, apparatus and system for implementing a video conference, and a storage medium thereof. The technical solutions are as follows.

According to an aspect of the present disclosure, a method for implementing a video conference is provided. The method includes:
  acquiring layout information of a conference picture of the video conference, wherein the layout information includes information of at least two conferee regions in the conference picture, and information of corresponding relationships between the at least two conferee regions and at least two terminals involved in the video conference;
  sending the information of the corresponding conferee regions to the at least two terminals;
  receiving conferee multimedia data provided by the at least two terminals based on the information of the corresponding conferee regions;
  acquiring conference video data based on the conferee multimedia data; and
  sending the conference video data to the at least two terminals.

Optionally, acquiring the layout information of the conference picture of the video conference includes:
  receiving the layout information sent by a master control terminal of the at least two terminals.

Optionally, upon receiving the layout information sent by the master control terminal, the method further includes:
  determining, in the case that a master control instruction designates a first terminal of the at least two terminals as the master control terminal, the first terminal as the master control terminal.

Optionally, the master control instruction includes at least one of: a speech instruction to be triggered by the first terminal, a master-control switch instruction to be triggered by the first terminal, and a master-control switch instruction to be triggered by a master control terminal prior to a current time.

Optionally, sending the information of the corresponding conferee regions to the at least two terminals includes:
  receiving layout application information sent by a second terminal of the at least two terminals; and
  sending, based on the layout application information, the information of the conferee region corresponding to the second terminal to the second terminal.

Optionally, acquiring the conference video data based on the conferee multimedia data includes:
  acquiring, in the case that the conferee multimedia data includes shared video data, the conference video data by processing the shared video data based on the layout information, wherein in the conference video data, a region occupied by the shared video data is larger than a region occupied by other conferee multimedia data except the shared video data.

Optionally, acquiring the conference video data based on the conferee multimedia data further includes:
  presenting the conference video data on a display screen.

Optionally, sending the conference video data to the at least two terminals includes:
  receiving layout adjustment information sent by a second terminal of the at least two terminals;
  adjusting the conference video data based on the layout adjustment information; and
  sending the adjusted conference video data to the second terminal.

According to another aspect, the embodiments of the present disclosure provide a method for implementing a video conference. The method includes:
  acquiring information of conferee regions corresponding to terminals provided by a conference apparatus;
  acquiring video data;
  acquiring conferee multimedia data based on the information of the conferee regions and the multimedia data;
  providing the conferee multimedia data to the conference apparatus;
  receiving conference video data provided by the conference apparatus; and
  presenting the conference video data.

Optionally, acquiring the conferee multimedia data based on the information of the conferee regions and the multimedia data includes:
  determining regions where persons in the multimedia data are located by performing person recognition on the multimedia data, and
  acquiring the conferee multimedia data by processing the multimedia data based on the information of the conferee regions and the regions where the persons are located, wherein in the conferee multimedia data, a proportion of the regions where the persons are located is greater than a specified value, Optionally, the method further includes:
  sending layout information to the conference apparatus, wherein the layout information includes information of at least two conferee regions in a conference picture, and information of corresponding relationships between the at least two conferee regions and at least two terminals involved in the video conference.

Optionally, acquiring the information of the conferee regions corresponding to the terminals provided by the conference apparatus includes:
  sending layout application information to the conference apparatus; and
  receiving the information, fed back by the conference apparatus, of the conferee regions corresponding to the terminals.

Optionally, receiving the conference video data provided by the conference apparatus includes:
  sending layout adjustment information to the conference apparatus; and
  receiving conference video data adjusted by the conference apparatus based on the layout adjustment information.

Optionally, presenting the conference video data includes:
  receiving an adjustment instruction; and
  presenting the conference video data adjusted based on the adjustment instruction.

According to another aspect, the embodiments of the present disclosure provide an apparatus for implementing a video conference. The apparatus for implementing the video conference includes:
  a layout acquiring module, configured to acquire layout information of a conference picture of the video conference, wherein the layout information includes information of at least two conferee regions in the conference picture, and information of corresponding relationships between the at least two conferee regions and at least two terminals involved in the video conference;
  a sending module, configured to send the information of the conferee regions, corresponding to the at least two terminals, to the at least two terminals;
  a receiving module, configured to receive conferee multimedia data provided by the at least two terminals based on the information of the corresponding conferee regions;
  a conference video acquiring module, configured to acquire conference video data based on the conferee multimedia data; and
  a conference video sending module, configured to send the conference video data to the at least two terminals.

According to another aspect, the embodiments of the present disclosure provide an apparatus for implementing a video conference. The apparatus for implementing the video conference includes:
  a region acquiring module, configured to acquire information of conferee regions corresponding to terminals provided by a conference apparatus;
  a video acquiring module, configured to acquire video data;
  a conferee video acquiring module, configured to acquire conferee multimedia data based on the information of the conferee regions and the multimedia data; and
  a conferee video providing module, configured to provide the conferee multimedia data to the conference apparatus.

According to another aspect, the embodiments of the present disclosure provide a system for implementing a video conference. The system includes a conference apparatus and at least two terminals; wherein
  the conference apparatus is configured to acquire layout information of a conference picture of the video conference, wherein the layout information includes: information of at least two conferee regions in the conference picture, and information of corresponding relationships between the at least two conferee regions and at least two terminals involved in the video conference;
  the conference apparatus is configured to send the information of the corresponding conferee regions to the at least two terminals;
  the terminals are configured to acquire multimedia data;
  the terminals are configured to acquire conferee multimedia data based on the information of the conferee regions and the multimedia data;
  the terminals are configured to provide the conferee multimedia data to the conference apparatus;
  the conference apparatus is configured to acquire conference video data based on the conferee multimedia data;
  the conference apparatus is configured to send the conference video data to the at least two terminals; and
  the terminals are configured to present the conference video data.

Optionally, the conference apparatus is configured to present the conference video data on a display screen;
  a second terminal of the at least two terminals is configured to send layout adjustment information to the conference apparatus;
  the conference apparatus is configured to send the conference video data to a first terminal of the at least two terminals, and send conference video data adjusted based on the layout adjustment information to the second terminal; and
  the first terminal is configured to present the conference video data, and the second terminal is configured to present the adjusted conference video data.

According to another aspect of the present disclosure, a conference apparatus is provided. The conference apparatus includes a processor and a memory storing therein at least one instruction, at least one program, a code set, or an instruction set; wherein the processor, when loading and executing the at least one instruction, the at least one program, the code set, or the instruction set, is caused to perform the method for implementing the video conference as defined above.

According to another aspect of the present disclosure, a terminal is provided. The terminal includes a processor and a memory storing therein at least one instruction, at least one program, a code set, or an instruction set; wherein the processor, when loading and executing the at least one instruction, the at least one program, the code set, or the instruction set, is caused to perform the method for implementing the video conference as defined above.

According to another aspect of the present disclosure, a computer non-transitory storage medium is provided. The computer non-transitory storage medium stores therein at least one instruction, at least one program, a code set, or an instruction set; wherein the at least one instruction, the at least one program, the code set, or the instruction set, when loaded and executed by a processor of a computer device, causes the computer device to perform the method for implementing the video conference as defined above.

According to another aspect of the present disclosure, a computer program product or computer program is provided. The computer program product or computer program includes at least one computer instruction, which is stored in a computer-readable storage medium. The at least one computer instruction, when loaded and executed by a processor of a computer device from the computer-readable storage medium, causes the computer device to perform the methods according to the various optional embodiments described above.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying draw

The embodiments of the present disclosure have been illustrated explicitly through the drawings above, and will be described in more detail below. These drawings and text descriptions are not intended to limit the scope of the inventive conception in any way, but to explain the concept of the present disclosure to persons of ordinary skill in the art with reference to specific embodiments.

DETAILED DESCRIPTION

In order to make the objects, technical solutions, and advantages of the present disclosure, embodiments of the present disclosure are described in detail hereinafter with reference to the accompanying drawings.

At present, in a method for implementing the video conference, terminals of a plurality of conferees are connected to a server. In the case that the video conference is started, the plurality of terminals transmit the acquired video data to the server, and the server, according to a predetermined layout pattern, lays out the video data transmitted by the plurality of terminals sequentially in different picture regions, thereby forming conference video data including the video data of each of the terminals.

However, in the above-mentioned conference video data generated by the server, the regions assigned to different terminals may not match sizes of the video data acquired by the terminals per se, which may lead to a problem of poor effect of the conference video data.

A video conference system, also known as a conference television system, refers to a system device for implementing teleconference by transmitting audio, video, and document data among two or more persons or groups from different places via transmission lines and multimedia devices, in order to realize instant and interactive communications.

Figure 1:
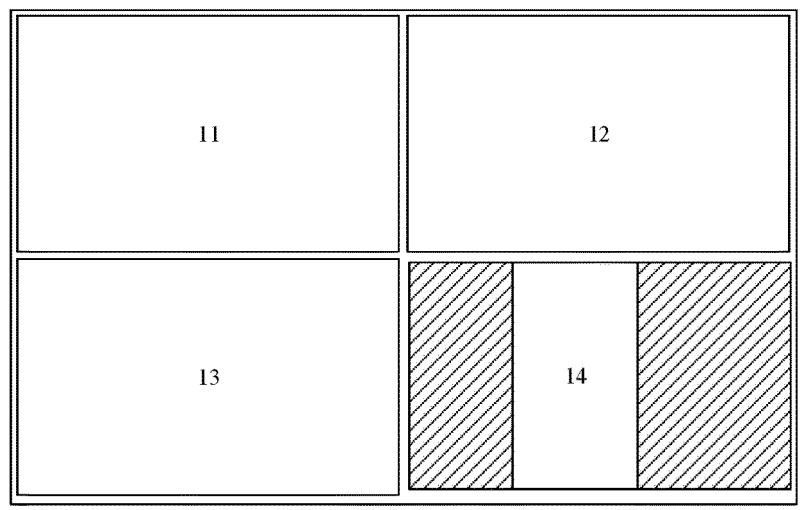
- FIG. 1 is a schematic diagram of display of a conference picture of video conference.

In a current manner of implementing the video conference, each of the terminals acquires video data of a conferee through respective camera. In response to acquiring the video data, the each of the terminals sends the acquired video data to a conference apparatus, and then the conference apparatus combines the received video data sent by the plurality of terminals into one conference video data. When the conference video data is displayed on a display screen, the video data acquired by each of the terminals involved in the video conference is displayed in different regions of the display screen. In an exemplary embodiment, as shown in FIG. 1, a schematic diagram of display of a conference picture of the video conference is given, wherein the conference picture includes 4 regions. The four regions display video data 11, 12, 13 and 14 provided by a terminal A, a terminal B, a terminal C and a terminal D, respectively. The display screen of each of the terminals involved in the video conference may display the conference picture, by which a technical effect of the video conference may be achieved.

It can be seen that in the above-mentioned manner of implementing the video conference, the size of the video data acquired by different terminals involved in the video conference may be different. For example, one conferee acquires the video data by a camera of a laptop computer, and another conferee acquires the video data by a camera of a mobile phone, thus leading to inconsistency in various parameters (such as an aspect ratio, a resolution, and a bit rate) of the acquired video data. This leads to the problem that a size of the video data of each of the terminals in the conference picture generated by the conference apparatus does not match a size of the conference picture, for example, diagonally hatched regions in the conference picture shown in FIG. 1. Furthermore, this will lead to the problem of poor display effect of the video conference.

Figure 2:
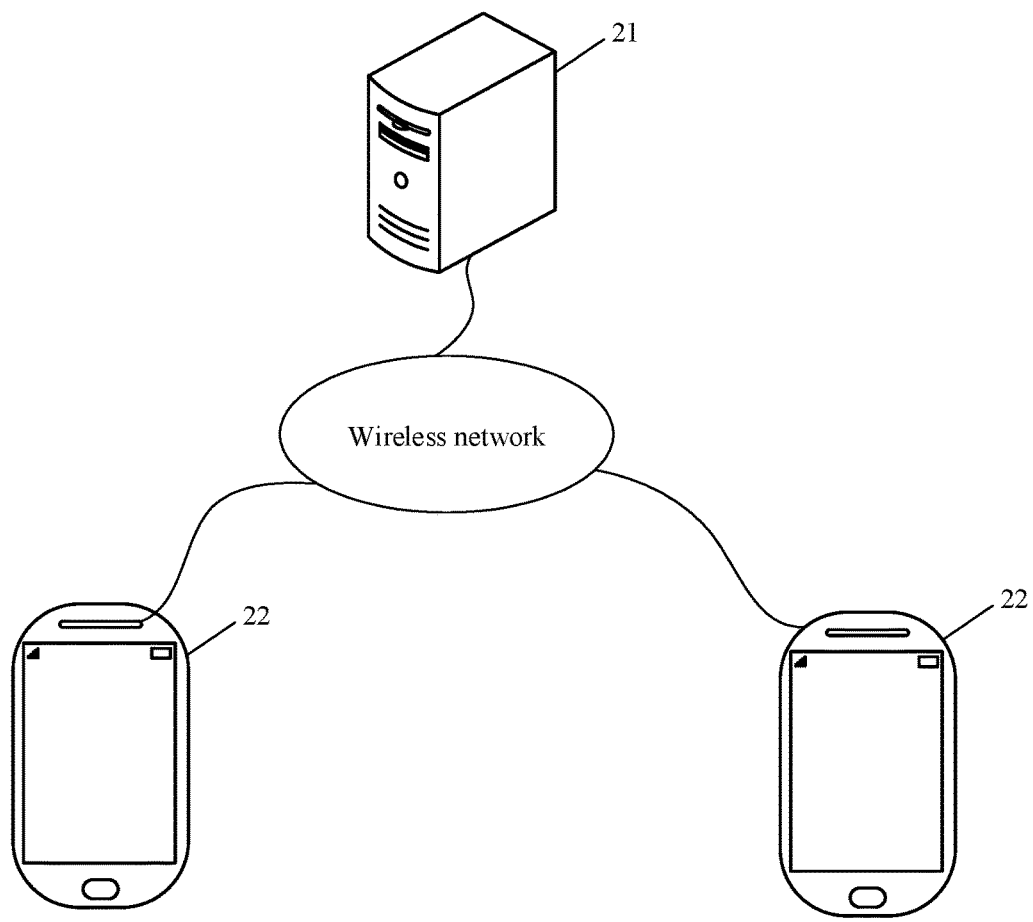
FIG. 2 is a schematic structural diagram of an implementation environment involved in an embodiment of the present disclosure.

FIG. 2 is a schematic structural diagram of an implementation environment involved in an embodiment of the present disclosure. The implementation environment includes a conference apparatus 21 and a plurality of terminals 22.

The conference apparatus 21 may include one server or a server cluster consisting of a plurality of servers, and the conference apparatus 21 may establish connections with the terminals 22 via a wired or wireless manner. In addition, in some embodiments, the conference apparatus 21 and the terminals 22 may also be the same hardware device, which is not limited in the embodiment of the present disclosure. The conference apparatus 21 may include a multi-point control unit (MCU) configured to implement multi-terminal calling and connecting.

The terminals 22 may include a mobile phone, a tablet computer, a desktop computer, a notebook computer, and various smart wearable devices. Each of the terminals 22 may be provided with one or more of components such as a display screen, a microphone, a speaker, a speaker connection component (such as a speaker interface or a wireless connection module) to implement various functions of the video conference.

Figure 3:
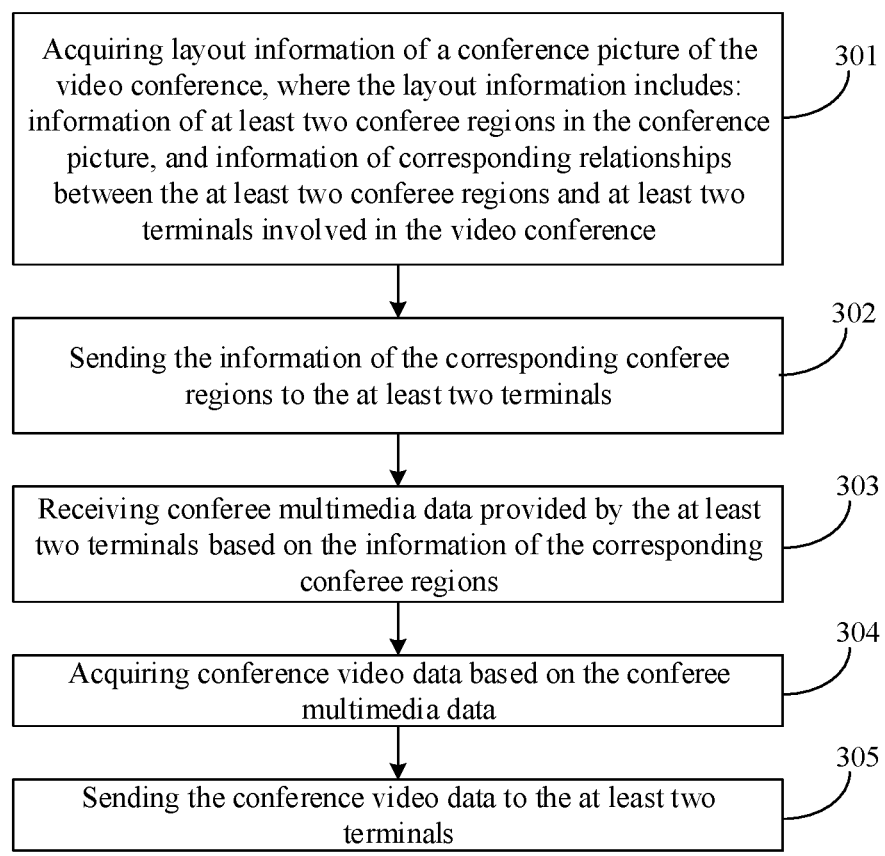
FIG. 3 is a flowchart of a method for implementing a video conference according to an embodiment of the present disclosure.

FIG. 3 is a flowchart of a method for implementing a video conference according to an embodiment of the present disclosure. This embodiment is illustrated, by way of an example that is applying the method for implementing the video conference to the conference apparatus in the implementation environment shown in FIG. 2. The method for implementing the video conference may include the following steps.

In step 301, layout information of a conference picture of the video conference is acquired, where the layout information includes: information of at least two conferee regions in the conference picture, and information of corresponding relationships between the at least two conferee regions and at least two terminals involved in the video conference.

In step 302, the information of the corresponding conferee regions is sent to the at least two terminals.

In step 303, conferee multimedia data provided by the at least two terminals based on the information of the corresponding conferee regions is received.

In step 304, conference video data is acquired based on the conferee multimedia data.

In step 305, the conference video data is sent to the at least two terminals.

The conferee multimedia data may include one or more of audio data, video data, image data, and text data.

In summary, in the method for implementing the video conference according to the embodiments of the present disclosure, the layout information of the conference picture of the video conference is acquired and then sent to the terminals involved in the video conference, such that the terminals involved in the video conference can acquire the conferee multimedia data conforming to the layout information based on the layout information; and then, in the case that the terminals involved in the video conference provide respective conferee multimedia data acquired by themselves to the conference apparatus, the conference apparatus may generate the conference video data with a matching size, and provide the conference video data to the terminals involved in the video conference and thus, a display effect of the conference video data is better. The problem on the poor effect of the conference video data in the related art is solved, and the display effect of the conference video data in the video conference is improved.

In addition, in a manner of implementing the video conference, the conference apparatus performs processing such as cropping and compression on video data uploaded by terminals involved in the video conference, such that the video data can meet various requirements of the conference picture of the video conference. However, this obviously will seriously increase an operation burden of the conference apparatus.

In the method for implementing the video conference according to the embodiment of the present disclosure, instead of performing processing such as compression and cropping on video images by the conference apparatus, the plurality of terminals involved in the video conference may individually process the acquired video data based on an indication of the information of the conferee regions sent by the conference apparatus, thereby greatly reducing the operation burden of the conference apparatus, furthermore, to improve the smoothness of the video conference.

Figure 4:
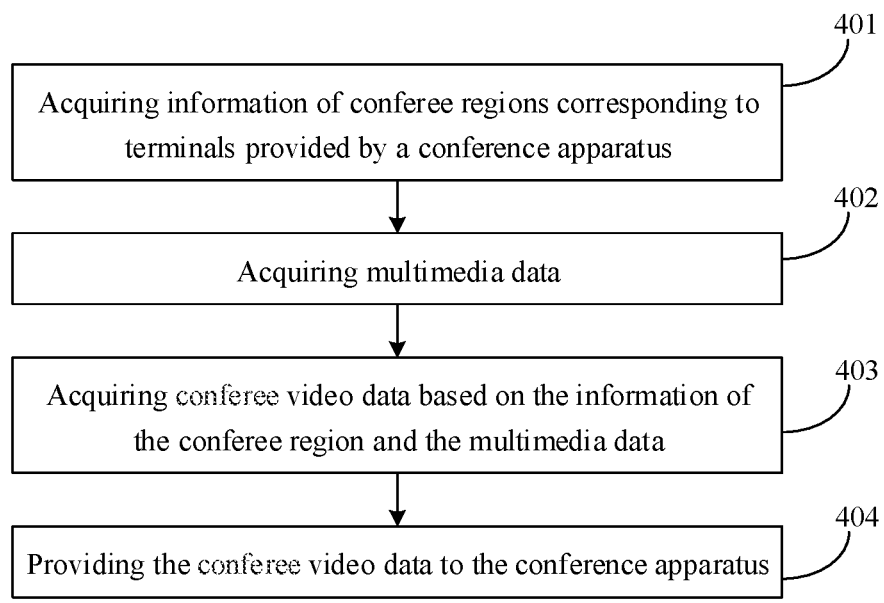
FIG. 4 is a flowchart of another method for implementing a video conference according to an embodiment of the present disclosure.

FIG. 4 is a flowchart of another method for implementing a video conference according to an embodiment of the present disclosure. This embodiment is illustrated, by way of an example that is applying the method for implementing the video conference to the terminals in the implementation environment shown in FIG. 2. The method for implementing the video conference may include the following steps.

In step 401, information of conferee regions corresponding to terminals provided by a conference apparatus is acquired.

In step 402, multimedia data is acquired.

In step 403, conferee multimedia data is acquired based on the information of the conferee regions and the multimedia data.

In step 404, the conferee multimedia data is provided to the conference apparatus.

In summary, in the method for implementing the video conference according to the embodiments of the present disclosure, the terminals involved in the video conference can acquire the conferee multimedia data meeting layout information based on the layout information provided by the conference apparatus; and then, in the case that the terminals involved in the video conference provide respective conferee multimedia data acquired by themselves to the conference apparatus, the conference apparatus may generate the conference video data with a matching size, and provide the conference video data to the terminals involved in the video conference; and thus, a display effect of the conference video data is better. The problem on the poor effect of the conference video data in the related art is solved, and the display effect of the conference video data in the video conference is improved.

Figure 5:
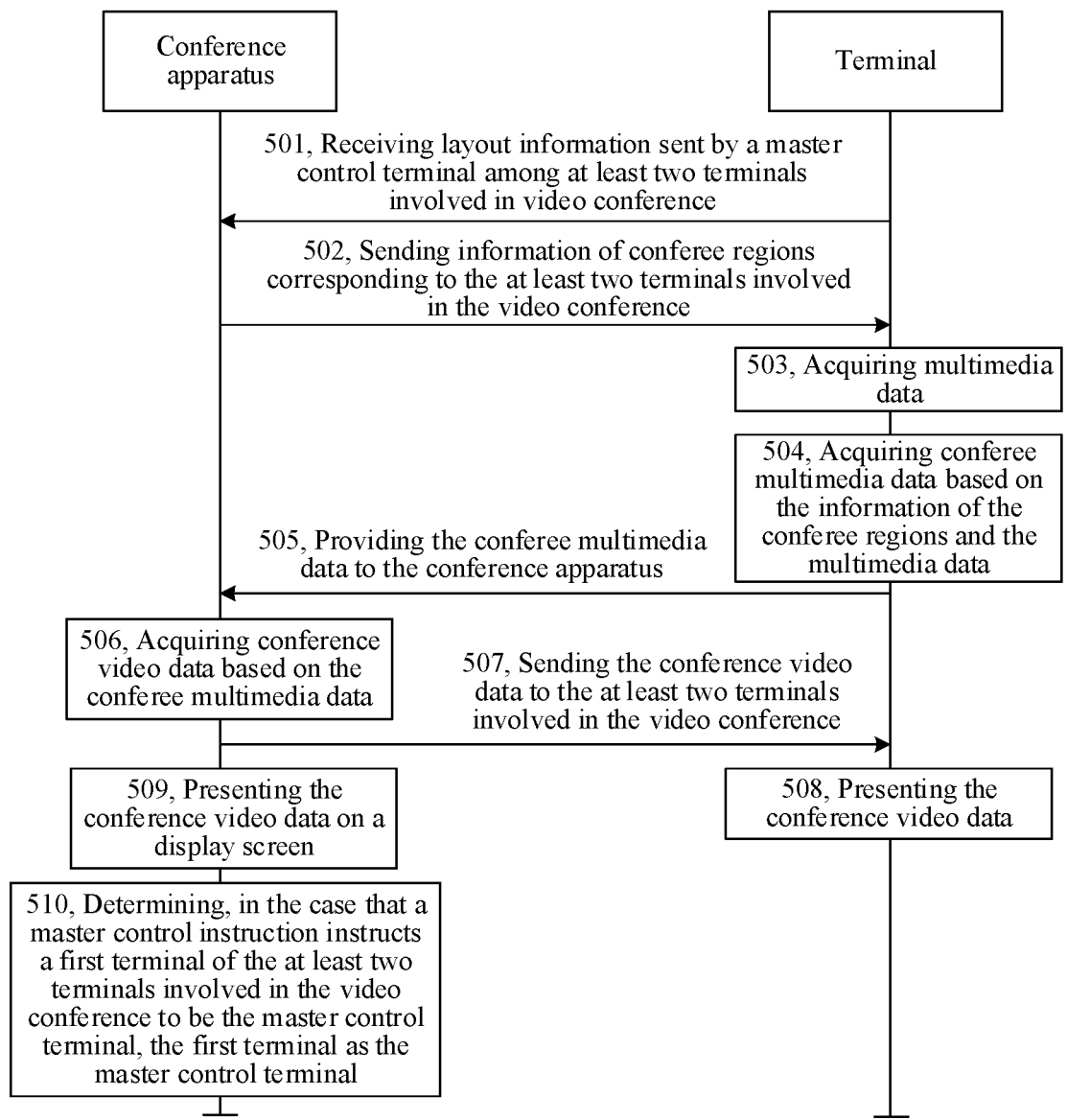
FIG. 5 is a flowchart of another method for implementing a video conference according to an embodiment of the present disclosure.

FIG. 5 is a flowchart of another method for implementing a video conference according to an embodiment of the present disclosure. This embodiment is illustrated, by way of an example that is applying the method for implementing the video conference to the implementation environment shown in FIG. 2. The method for implementing the video conference may include the following steps.

In step 501, the conference apparatus receives layout information sent by a master control terminal among at least two terminals involved in the video conference.

The layout information includes: information of at least two conferee regions in the conference picture, and information of corresponding relationships between the at least two conferee regions and at least two terminals involved in the video conference. In a conference picture of the video conference, the at least two conferee regions are configured to display video data provided by the terminals involved in the video conference. The information of the conferee regions may include various parameters of the conferee regions, for example, a region shape, a resolution, a bit rate, a color, a length of a region edge, or the like.

Based on the information of the conferee regions, the terminals may process the acquired video data into conferee multimedia data matching the conferee regions, that is, the video data that may be precisely presented in the conferee regions.

The terminals involved in the video conference may be determined before this step. In an exemplary embodiment, the conference apparatus may establish video conference, and the terminals may attend the video conference via authentication information (such as a user name and a password). Before the video conference starts, the conference apparatus may determine terminals involved in the video conference.

Alternatively, in the case that the video conference starts, a new terminal may also attend the video conference. In this case, step 501 may be re-executed to re-determine the layout information.

The master control terminal may be one of the plurality of terminals involved in the video conference, and may be configured to control the video conference. Step 501 provides a manner of acquiring the layout information. However, the conference apparatus may also acquire the layout information in other manners. For example, the conference apparatus has the layout information pre-stored locally. This not limited in the embodiments of the present disclosure, In step 502, the conference apparatus sends information of conferee regions corresponding to the at least two terminals involved in the video conference.

The conference apparatus may send the information of the conferee region, corresponding to each of the terminals, to each of the terminals involved in the video conference. For example, if a terminal A involved in the video conference corresponds to a conferee region 51 in a video view, and a terminal B involved in the video conference corresponds to a conferee region 52 in the video view, the conference apparatus may send the information of the conferee region 51 to the terminal A, and send the information of the conferee region 52 to the terminal B.

In an exemplary embodiment, the conference apparatus may also send the layout information to each of the terminals involved in the video conference. That is, each of the terminals involved in the video conference may receive information of all the conferee regions.

Figure 6:
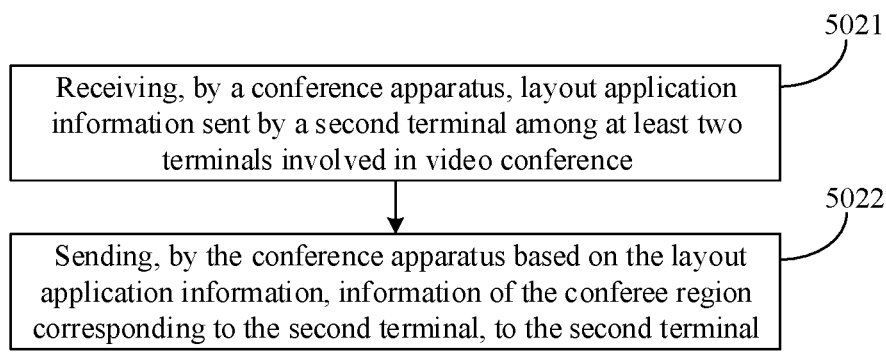
FIG. 6 is a flowchart of sending information of conferee regions according to the embodiment shown in FIG. 5.

In step 502, the conference apparatus may directly send the information of the corresponding conferee regions to the terminals involved in the video conference. Alternatively, another manner of sending the information of the conferee regions in step 502 shown in FIG. 6 may include the following steps.

In sub-step 5021, the conference apparatus receives layout application information sent by a second terminal of the at least two terminals involved in video conference.

The second terminal may be one of the terminals involved in the video conference, and may actively send the layout application information to the conference apparatus.

In sub-step 5022, the conference apparatus sends, based on the layout application information, information of the conferee region corresponding to the second terminal, to the second terminal.

In response to receiving the layout application information from the second terminal, the conference apparatus may send the information of the conferee region corresponding to the second terminal, to the second terminal.

In response to getting ready for the video conference, each of the terminals involved in the video conference may send the layout application information to the conference apparatus to acquire the information of the corresponding conferee region.

In step 503, terminals acquire multimedia data.

The multimedia data may include: video data acquired via camera assemblies of the terminals involved in the video conference, or shared video data provided by the terminals, or images and audio data provided by the terminals, or the like.

The video data acquired by the camera assemblies may be video data of the conferees per se, or video data of ambient environments of the conferees. In an exemplary embodiment, when the terminals are mobile phones, the video data of the conferees may be acquired via front cameras (or rear cameras) of the mobile phones.

The shared video data may include some views to be presented by the conferees, such as slide presentations (like PPT), documents, tables, pictures, and videos, audios, web pages, or other multimedia information stored locally in the terminals. These information may be provided by recording a display screen window or an application window.

In step 504, the terminals acquire conferee multimedia data based on the information of the conferee regions and the multimedia data.

In response to acquiring the multimedia data, the terminals may acquire the conferee multimedia data by processing the multimedia data based on the information of the conferee regions.

In an exemplary embodiment, if the multimedia data may be video data with a resolution of 800×600 acquired by a terminal, and the resolution recorded in the information of the corresponding conferee region is 200×300, the terminal may crop the video data with the resolution of 800×600 into video data with a resolution of 200×300 which may be used as the conferee multimedia data. In addition, the terminals may also adjust other parameters of the video data, such as the bit rate and the color, based on the information of the conferee regions.

Figure 7:
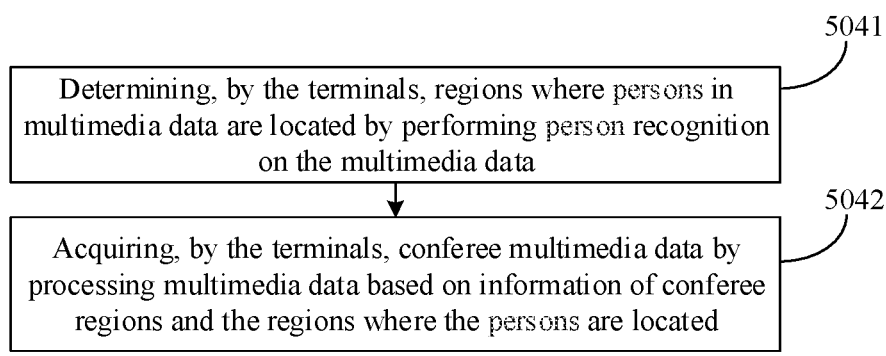
FIG. 7 is a flowchart of acquiring conferee multimedia data according to the embodiment shown in FIG. 5.

In an exemplary embodiment, as shown in FIG. 7, step 504 may include the following two sub-steps.

In sub-step 5041, the terminals determine regions where persons in the multimedia data are located by performing person recognition on the multimedia data.

The terminals may recognize regions where human faces (or human faces and shoulders; in the multimedia data (such as a video data) are located by the person recognition technology.

In an exemplary embodiment, the terminals may perform region division on each frame of image of the video data to divide it into a plurality of small-size images. By using the adaboost algorithm (an iterative algorithm), whether each region includes human head and shoulder features is recognized sequentially. When the judgment is positive, coordinates and size of the region are recorded; and when the judgment is negative, no coordinate information is recorded. In a similar fashion, the entire image is traversed and searched to determine regions occupied by the head and shoulders in the image.

In sub-step 5042, the terminals acquire conferee multimedia data by processing multimedia data based on the information of the conferee regions and the regions where the persons are located.

The terminals may perform operations such as cropping and compression on the acquired multimedia data (such as a video data) based on the information of the conferee regions and the regions where the persons are located, such that a proportion of a region where each person is located in the conferee video data can be greater than a specified value, in an exemplary embodiment, the specified value is 50% to 75%.

In an exemplary embodiment, if a resolution recorded in the information of the conferee regions is 200×300, and the terminal acquires the video data with a resolution of 800×600, the terminals may process the video data into the conferee multimedia data with the resolution of 200×300, and with the proportion of the region, where the person is located, of 75%.

Through person recognition, the region where each person is located in the conferee multimedia data is allowed to be greater, which may make the person in the video view prominent, and thus enhance the effect of the video conference.

In step 505, the terminals provide the conferee multimedia data to the conference apparatus.

The terminals may real-time process the conferee multimedia data, and real-time transmit the conferee multimedia data to the conference apparatus.

In step 506, the conference apparatus acquires conference video data based on the conferee multimedia data.

The conference apparatus may acquire the conferee multimedia data provided by the plurality of terminals involved in the video conference, and combine the plurality of conferee multimedia data into conference video data. The conference apparatus may lay out the plurality of conferee multimedia data in the conference picture based on the layout information determined in step 501.

Optionally, in the case that the conferee multimedia data includes shared video data, the conference apparatus acquires the conference video data by processing the shared video data based on the layout information. In the conference video data, a region occupied by the shared video data is larger than a region occupied by other conferee multimedia data except the shared video data. That is, a display region of the shared video data is allowed to be larger than display regions of other conferee multimedia data, so as to make the shared video data prominent, and thus improving the display effect of the video conference.

The information of the conferee region corresponding to the shared video data may be recorded in the layout information, and in step 501, sent to a terminal that provides the shared video data. In this case, the terminals involved in the video conference may send shared information to the master control terminal or conference apparatus in advance, indicating the intention to provide shared video data such that the master control terminal or conference apparatus can determine the corresponding layout information.

In addition, there may also be a terminal that temporarily provides shared video data. In this case, the terminal may also send the shared information to the master control terminal (or the conference apparatus), and re-perform step 501 to determine new layout information.

The shared video data may have an identifier, and the conference apparatus may determine whether the shared video data is included in the conferee multimedia data via the identifier.

Figure 8:
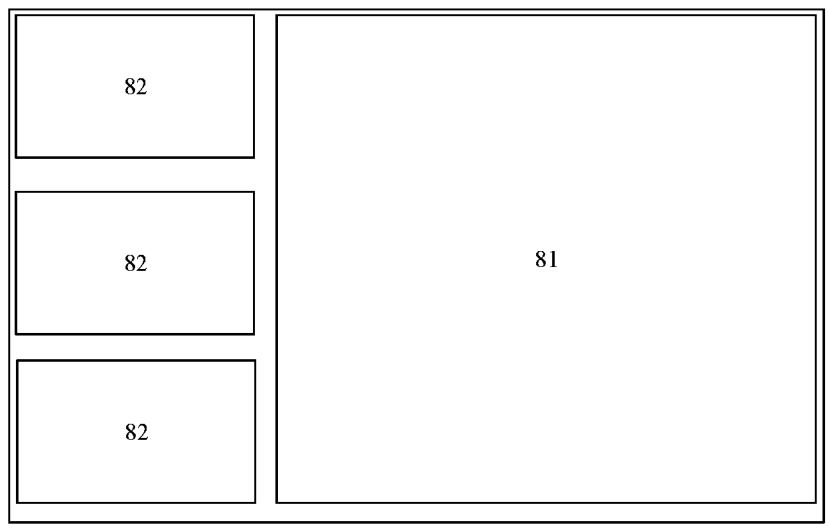
FIG. 8 is a schematic diagram of a conference picture of the video conference according to the embodiment shown in FIG. 5.

In an exemplary embodiment, as shown in FIG. 8, a schematic diagram of a conference picture of video conference according to an embodiment of the present disclosure is given. In this conference picture, shared video data 81 is displayed in a largest region, and other video data 82 displaying the conferees is displayed in other smaller regions. In this layout, all conferees may see the screen presented by the shared video data more clearly, which improves the display effect of the video conference.

In step 507, the conference apparatus sends the conference video data to the at least two terminals involved in the video conference.

The conference apparatus may send the conference video data to each of the terminals involved in the video conference.

In an exemplary embodiment, the conference apparatus may also individually adjust the conference video data presented to one or more of the terminals. In an exemplary embodiment, step 507 may include the following steps.

(1) The conference apparatus receives layout adjustment information sent by a second terminal of the at least two terminals.

The second terminal may send the layout adjustment information to the conference apparatus. The layout adjustment information may include a layout pattern different from the above-mentioned layout information. For example, compared with the above-mentioned layout information, in the layout adjustment information, a size of a conferee region corresponding to a certain terminal becomes larger, and a size of a conferee region corresponding to another terminal becomes smaller.

(2) The conference apparatus adjusts the conference video data based on the layout adjustment information.

The conference apparatus may adjust the conference video data based on the layout adjustment information by a local image processing assembly (such as an MCU). It should be noted that the conference apparatus may only adjust the conference video data to be sent the second terminal, rather than adjusting the conference video data to be sent to other terminals that have not sent the layout adjustment information (such as the first terminal).

(3) The conference apparatus sends adjusted conference video data to the second terminal.

Accordingly, the conference apparatus sends the unadjusted conference video data to other terminals involved in the video conference except the second terminal. In this case, the conference video data displayed by the second terminal is distinguished from the conference video data displayed by other terminals involved in the video conference, which enriches the diversity and user experience of the video conference.

In step 508, the terminals present the conference video data.

Figure 9:
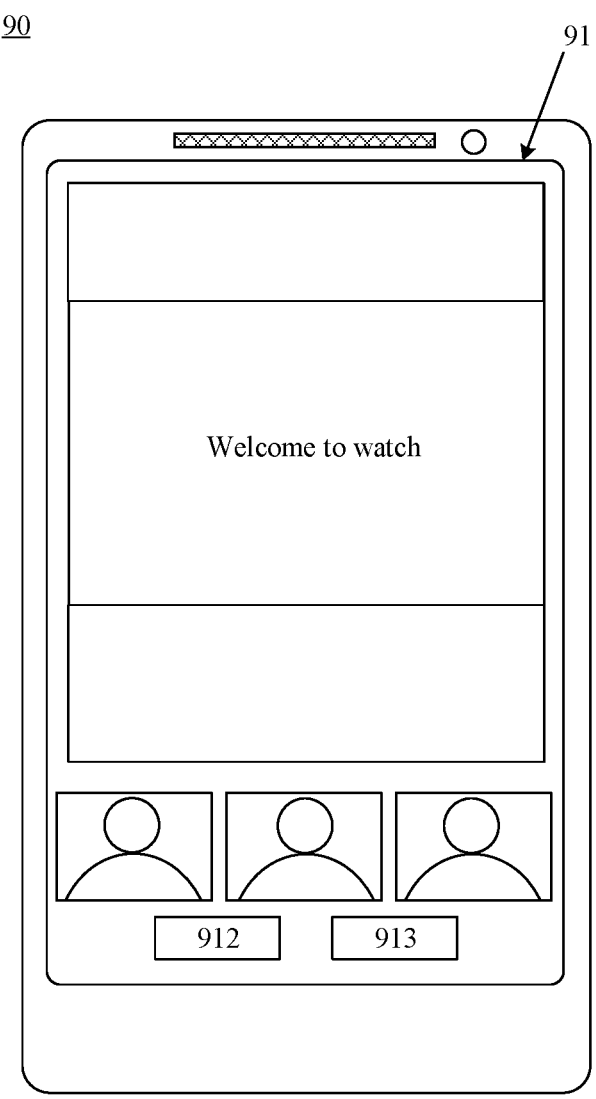
FIG. 9 is a schematic diagram of display of a terminal according to the embodiment shown in FIG. 5.

The terminals may present the conference video data acquired from the conference apparatus on the display screens. In an exemplary embodiment, as shown in FIG. 9, a schematic diagram of display of a terminal is given. A terminal 90 presents a conference picture 91 consisting of the conference video data on a display screen. Conferees may watch the conference picture 91, and the conference picture 91 may also be provided with a speech button 912 and a host switching button 913. The speech button 912 is configured to be triggered in the case that a conferee makes a speech, and the host switching button 913 is configured to be triggered in the case that a conferee intends to apply to be a host.

Figure 10:
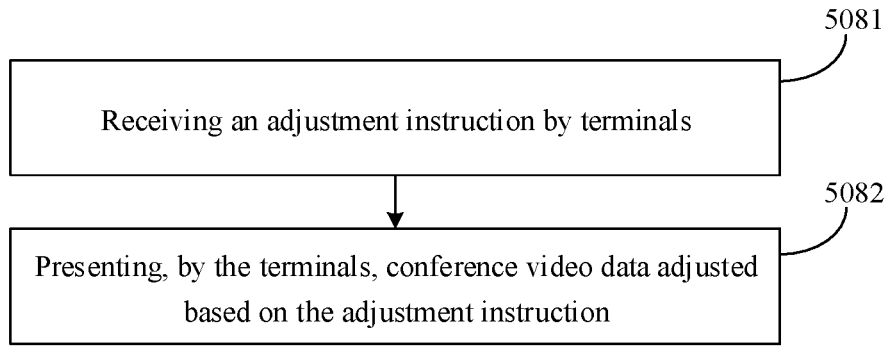
FIG. 10 is a flowchart of presenting conference video data according to the embodiment shown in FIG. 5.

In an exemplary embodiment, as shown in FIG. 10, step 508 may include the following two steps.

In step 5081, the terminals receive an adjustment instruction.

The adjustment instruction may be triggered by a conferee operating a terminal, and is configured to adjust a layout of a conference picture presented on a display screen of the terminal.

In an exemplary embodiment, in the case that a conferee operating the terminal A wants to make the video data provided by a terminal of a conferee B prominent, he/she may trigger the adjustment instruction on the terminal A to adjust the layout pattern of the conference picture, such that a display region of the video data provided by the conferee B can become larger (accordingly, regions occupied by video data provided by terminals of other conferees may be reduced).

In step 5082, the terminals present conference video data adjusted based on the adjustment instruction.

The terminals may acquire adjusted conference video data by adjusting the conference video data provided by the conference apparatus based on the adjustment instruction, and present the adjusted conference video data on the display screens. The terminals may dynamically adjust the conference video data by local image processing assemblies (such as graphics processing units (GPUs)).

It should be noted that the adjustment instruction is configured to adjust the layout of the conference picture presented on a local display screen of each of the terminals, and will not affect the conference pictures presented on other terminals involved in the video conference.

In an exemplary embodiment, in the case that the conferee operating the terminal A wants to change the layout of the conference picture, he/she may trigger the adjustment instruction in the terminal A to adjust the layout of the conference picture presented on a display screen of the terminal A. However, the layout of the conference picture presented on the display screen of the terminal B may still be the layout in the conference video data provided by the conference apparatus.

In step 509, the conference apparatus presents the conference video data on a display screen.

In an exemplary embodiment, the conference apparatus is also provided with a display screen, and may present the conference video data on the display screen. On this basis, there may also be one or more conferees beside the conference apparatus. The one or more conferees may attend the video conference via the conference apparatus, and control the video conference via the conference apparatus, such as controlling the layout information of the conference video data.

In step 510, in the case that a master control instruction instructs a first terminal of the at least two terminals involved in the video conference to be the master control terminal, the conference apparatus determines the first terminal as the master control terminal.

In the method for implementing the video conference according to the embodiment of the present disclosure, the master control terminal may also make changes. For example, in the case that the master control instruction instructs the first terminal of the at least two terminals involved in the video conference to be the master control terminal, the conference apparatus may determine the first terminal as the master control terminal.

The master control instruction may include at least one of a speech instruction to be triggered by the first terminal, a master-control switch instruction to be triggered by the first terminal, a master-control switch instruction to be triggered by a master control terminal prior to a current time (that is, a determination is performed by a previous master control terminal), and a control instruction to be triggered by the conference apparatus. For example, when the conference apparatus is provided with a display screen, the control instruction may be triggered by the conference apparatus to adjust and control the master control terminal. In addition, in the conference video data, an identifier may also be added to a conferee region corresponding to the master control terminal, such that each of terminals may recognize the master control terminal to facilitate the conduction of the video conference.

By means of switching the master control terminal, the method for implementing the video conference may be more flexible.

In summary, in the method for implementing the video conference according to the embodiments of the present disclosure, the layout information of the conference picture of the video conference is acquired and then sent to the terminals involved in the video conference, such that the terminals involved in the video conference can acquire the conferee multimedia data conforming to the layout information based on the layout information; and then, in the case that the terminals involved in the video conference provide respective conferee multimedia data acquired by themselves to the conference apparatus, the conference apparatus may generate the conference video data with a matching size, and provide the conference video data to the terminals involved in the video conference and thus, a display effect of the conference video data is better. The problem on the poor effect of the conference video data in the related art is solved, and the display effect of the conference video data in the video conference is improved.

In addition, in the method for implementing the video conference according to the embodiment of the present disclosure, instead of performing, processing such as compression and cropping on the video images by the conference apparatus, the plurality of terminals involved in the video conference may individually process acquired video data based on the indication of the information of the conferee regions sent by the conference apparatus, thereby greatly reducing the operation burden of the conference apparatus, furthermore, to improve the smoothness of the video conference.

Figure 11:
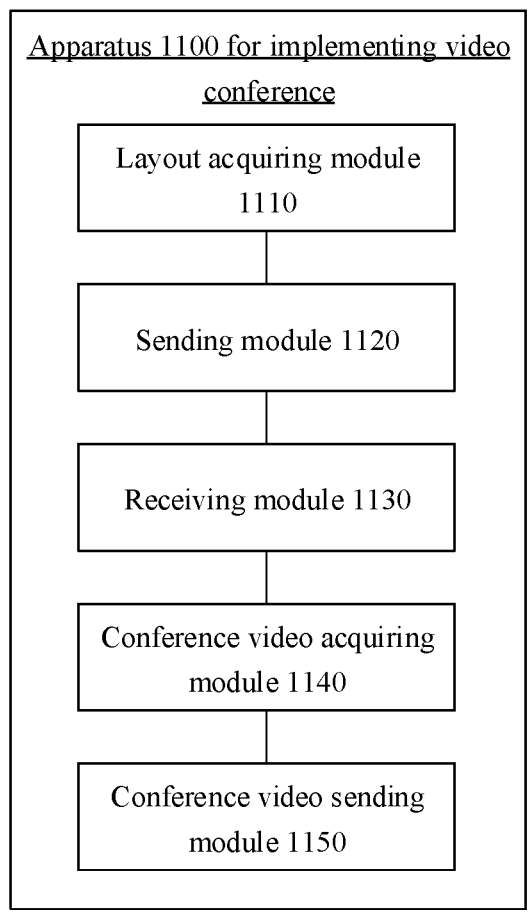
FIG. 11 is a block diagram of an apparatus for implementing a video conference according to an embodiment of the present disclosure.

FIG. 11 is a block diagram of an apparatus for implementing a video conference according to an embodiment of the present disclosure. The apparatus 1100 for implementing the video conference includes the following modules.

A layout acquiring module 1110 is configured to acquire layout information of a conference picture of the video conference, where the layout information includes: information of at least two conferee regions in the conference picture, and information of corresponding relationships between the at least two conferee regions and at least two terminals involved in the video conference.

A sending module 1120 is configured to send the information of the conferee regions corresponding to the at least two terminals to the at least two terminals.

A receiving module 1130 is configured to receive conferee multimedia data provided by the at least two terminals based on the information of the corresponding conferee regions.

A conference video acquiring module 1140 is configured to acquire conference video data based on the conferee multimedia data.

A conference video sending module 1150 is configured to send the conference video data to the at least two terminals.

In summary, in the apparatus for implementing the video conference according to the embodiments of the present disclosure, the layout information of the conference picture of the video conference is acquired and then sent to the terminals involved in the video conference, such that the terminals involved in the video conference can acquire the conferee multimedia data conforming to the layout information based on the layout information; and then, in the case that the terminals involved in the video conference provide respective conferee multimedia data acquired by themselves to the conference apparatus, the conference apparatus may generate the conference video data with a matching size, and provide the conference video data to the terminals involved in the video conference; and thus, a display effect of the conference video data is better. The problem on the poor effect of the conference video data in the related art is solved, and the display effect of the conference video data in the video conference is improved.

Optionally, the layout acquiring module is configured to:
receive the layout information sent by a master control terminal of the at least two terminals.

Optionally, the conference apparatus further includes:
a host determining module configured to determine, in the case that a master control instruction instructs a first terminal of the at least two terminals to be the master control terminal, the first terminal as the master control terminal.

Optionally, the master control instruction includes at least one of: a speech instruction to be triggered by the first terminal, a master-control switch instruction to be triggered by the first terminal, and a master-control switch instruction to be triggered by a master control terminal prior to a current time.

Optionally, the sending module is configured to:
receive layout application information sent by a second terminal of the at least two terminals; and
send, based on the layout application information, the information of the conferee region corresponding to the second terminal to the second terminal.

Optionally, the conference video acquiring module includes:
acquiring, in the case that the conferee multimedia data includes shared video data, the conference video data by processing the shared video data based on layout information, where in the conference video data, a region occupied by the shared video data is larger than a region occupied by other conferee multimedia data except the shared video data.

Optionally, the conference apparatus further includes:
a conference presenting module configured to present the conference video data on a display screen.

Figure 12:
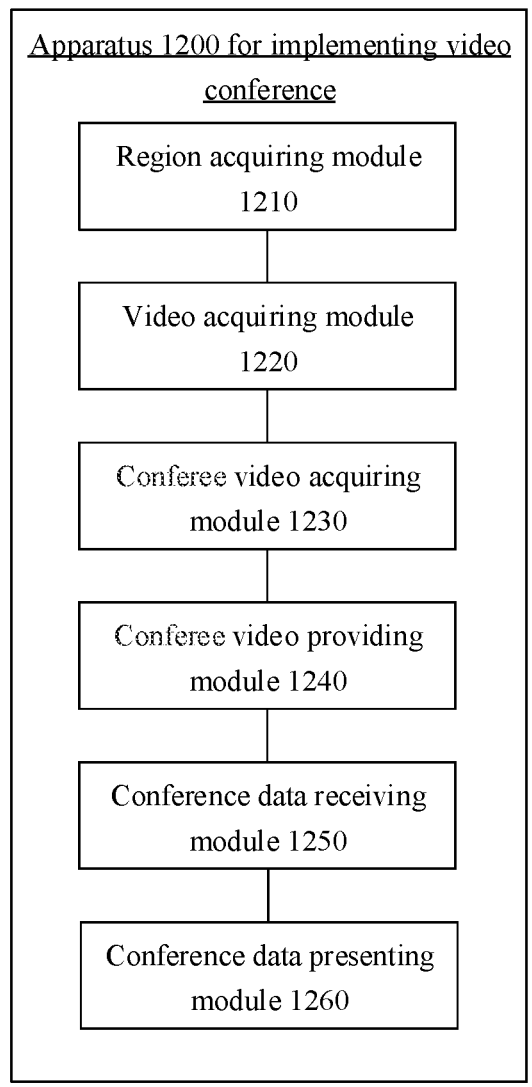
FIG. 12 is a block diagram of another apparatus for implementing a video conference according to an embodiment of the present disclosure.

FIG. 12 is a block diagram of another apparatus for implementing a video conference according to an embodiment of the present disclosure. The apparatus 1200 for implementing the video conference includes:
a region acquiring module 1210 configured to acquire information of conferee regions corresponding to terminals provided by a conference apparatus;
a video acquiring module 1220 configured to acquire multimedia data;
a conferee video acquiring module 1230 configured to acquire conferee multimedia data based on the information of the conferee regions and the multimedia data;
a conferee video providing module 1240 configured to provide the conferee multimedia data to the conference apparatus;
a conference data receiving module 1250 configured to receive conference video data provided by the conference apparatus; and
a conference data presenting module 1260 configured to present the conference video data.

In summary, in the apparatus for implementing the video conference according to the embodiments of the present disclosure, the terminals involved in the video conference may acquire the conferee multimedia data conforming to the layout information based on the layout information provided by the conference apparatus and then, in the case that the terminals involved in the video conference provide respective conferee multimedia data acquired by themselves to the conference apparatus, the conference apparatus may generate the conference video data with a matching size, and provide the conference video data to the terminals involved in the video conference; and thus, a display effect of the conference video data is better. The problem on the poor effect of the conference video data in the related art is solved, and the display effect of the conference video data in the video conference is improved.

Optionally, the conferee video acquiring module is configured to:

determine regions where persons in the multimedia data are located by performing person recognition on the video data; and
acquire the conferee multimedia data by processing the video data based on the information of the conferee regions and the regions where the persons are located, where in the conferee multimedia data, a proportion of the regions where the persons are located is greater than a specified value.

Optionally, each of the terminals further includes:
a layout information sending module configured to send layout information to the conference apparatus, where the layout information includes: information of at least two conferee regions in a conference picture, and information of corresponding relationships between the at least two conferee regions and at least two terminals involved in the video conference.

Optionally, the region acquiring module is configured to:
send layout application information to the conference apparatus; and
receive the information, fed back by the conference apparatus, of the conferee regions corresponding to the terminals.

Optionally, the conference data presenting module is configured to:
receive an adjustment instruction; and
present the conference video data adjusted based on the adjustment instruction.

Figure 13:
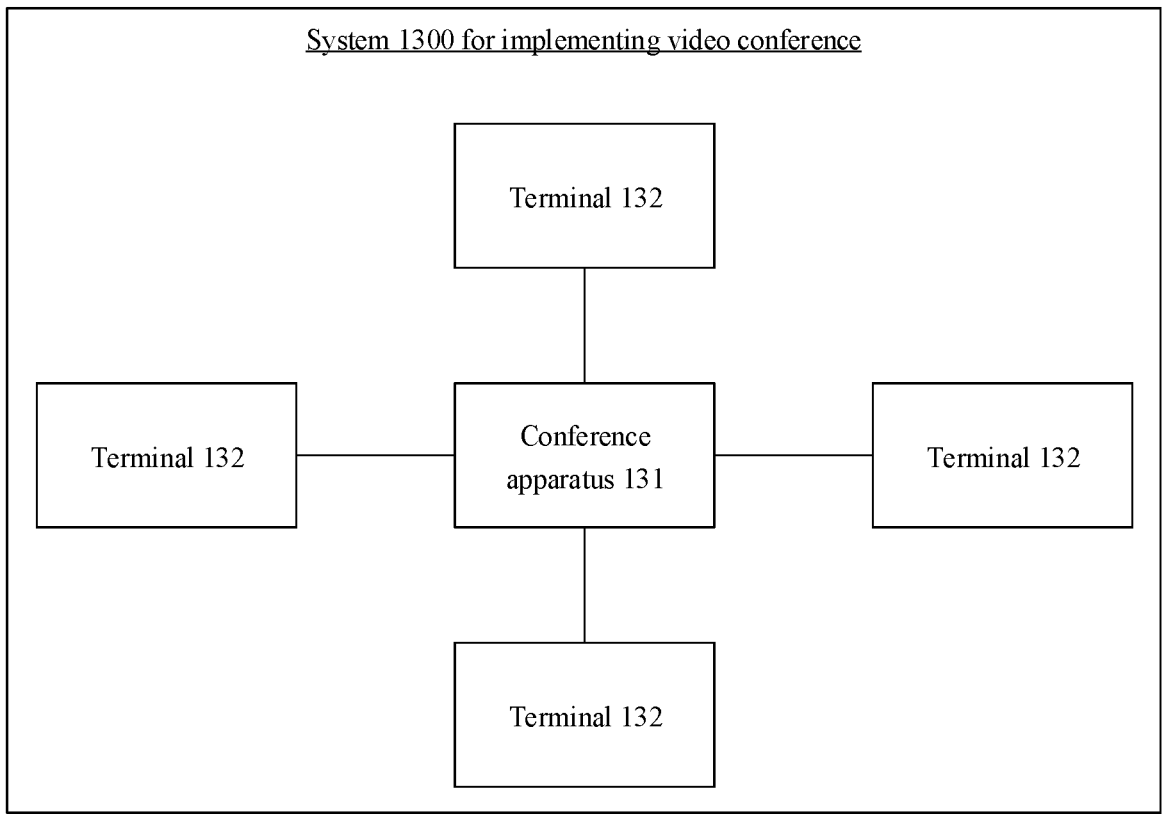
FIG. 13 is a structural block diagram of a system for implementing a video conference according to an embodiment of the present disclosure.

FIG. 13 is a structural block diagram of a system for implementing a video conference according to an embodiment of the present disclosure. The system 1300 includes a conference apparatus 131 and at least two terminals 132.

The conference apparatus 131 is configured to acquire layout information of a conference picture of the video conference, where the layout information includes: information of at least two conferee regions in the conference picture, and information of corresponding relationships between the at least two conferee regions and at least two terminals involved in the video conference.

The conference apparatus 131 is configured to send the information of the conferee regions corresponding to the at least two terminals to the at least two terminals.

The terminals 132 are configured to acquire multimedia data.

The terminals 132 are configured to acquire conferee multimedia data based on the information of the conferee regions and the multimedia data.

The terminals 132 are configured to provide the conferee multimedia data to the conference apparatus.

The conference apparatus 131 is configured to acquire conference video data based on the conferee multimedia data.

The conference apparatus 131 is configured to send the conference video data to the at least two terminals; and the terminals 132 are configured to present the conference video data.

In addition, in the embodiment of the present disclosure, reference may also be made to the embodiment shown in FIG. 5 for a method performed by the conference apparatus 131 and the terminals 132, and the details are not given herein any further.

In summary, in the system for implementing the video conference according to the embodiments of the present disclosure, the layout information of the conference picture of the video conference is acquired and then sent to the terminals involved in the video conference, such that the terminals involved in the video conference can acquire the conferee multimedia data conforming to the layout information based on the layout information; and then, in the case that the terminals involved in the video conference provide respective conferee multimedia data acquired by themselves to the conference apparatus, the conference apparatus may generate the conference video data with a matching size, and provide the conference video data to the terminals involved in the video conference; and thus, a display effect of the conference video data is better. The problem on the poor effect of the conference video data in the related art is solved, and the display effect of the conference video data in the video conference is improved.

Optionally, the conference apparatus 131 is configured to present the conference video data on a display screen.

A second terminal 1321 of the at least two terminals is configured to send layout adjustment information to the conference apparatus 131.

The conference apparatus 131 is configured to send the conference video data to a first terminal 1322 (which may be a terminal that has not sent the layout adjustment information to the conference apparatus) of the at least two terminals, and send the conference video data adjusted based on the layout adjustment information to the second terminal 1321.

The first terminal 1322 is configured to present the conference video data, and the second terminal 1321 is configured to present the adjusted conference video data. That is, the conference video data presented by a terminal that has not sent the layout adjustment information to the conference apparatus is distinguished from the conference video data displayed by a terminal that has sent the layout adjustment information to the conference apparatus.

According to another aspect of the present disclosure, a computer program product or computer program is provided. The computer program product or computer program includes at least one computer instruction, which is stored in a computer-readable storage medium. The at least one computer instruction, when loaded and executed by a processor of a computer from the computer-readable storage medium, causes the computer device to perform the methods according to the various optional embodiments described above.

Figure 14:
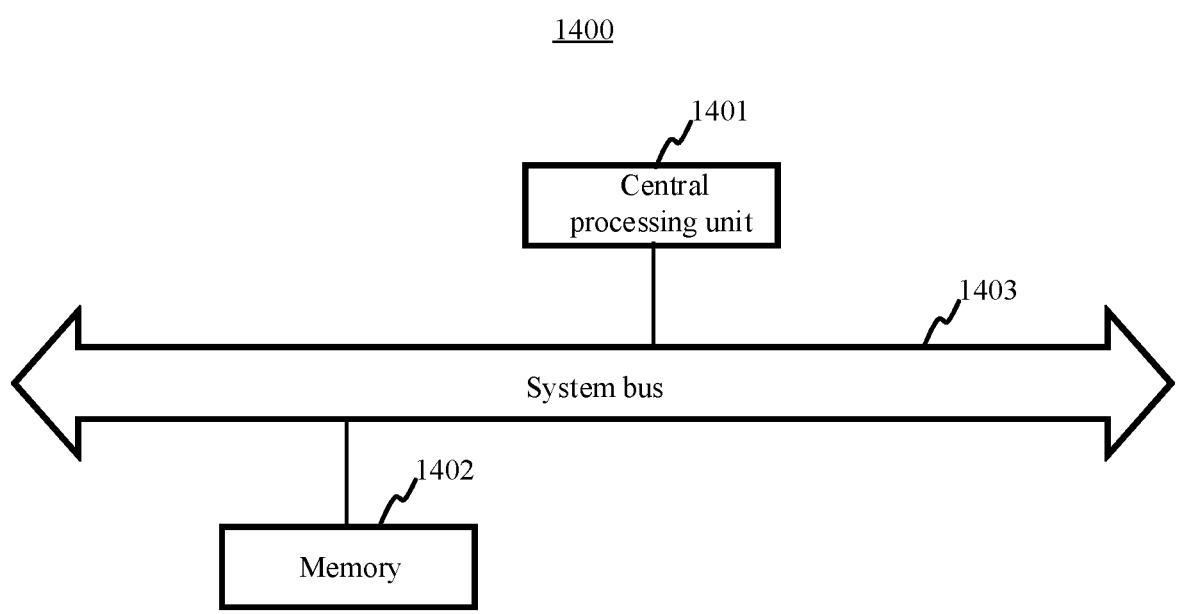
FIG. 14 is a schematic structural diagram of a conference apparatus according to an embodiment of the present disclosure.

FIG. 14 is a schematic structural diagram of a conference apparatus 1400 according to an embodiment of the present disclosure. The conference apparatus 1400 may be a server. In an exemplary embodiment, as shown in FIG. 14, the conference apparatus 1400 includes a central processing unit (CPU) 1401, a memory 1402, and a system bus 1403 connecting the memory 1402 and the central processing unit 1401. The memory 1402 may include a computer-readable medium (not shown) such as a hard disk or a compact disc read-only memory (CD-ROM).

Without loss of generality, the computer-readable medium may include a computer storage medium (which may be a non-transitory storage medium) and a communication medium. The computer storage medium includes volatile and nonvolatile as well as removable and non-removable media, which are implemented by any method or technology configured to store information such as computer-readable instructions, data structures, program modules or other data. The computer storage medium includes a random-access memory (RAM), a read-only memory (ROM), an erasable programmable read-only memory (EPROM), an electrically erasable programmable read-only memory (EEPROM), a flash memory or other solid-state storage technologies, a CD-ROM, a digital versatile disc (DVD) or other optical memories, a tape cassette, a magnetic tape, a disk memory or other magnetic storage devices. Certainly, persons of ordinary skill in the art may understand that the computer storage medium is not limited to those described above.

The memory 1402 further includes one or more programs, which may be stored in the memory and configured to be executed by the CPU for implementing the method for implementing the video conference according to the embodiments of the present disclosure.

Figure 15:
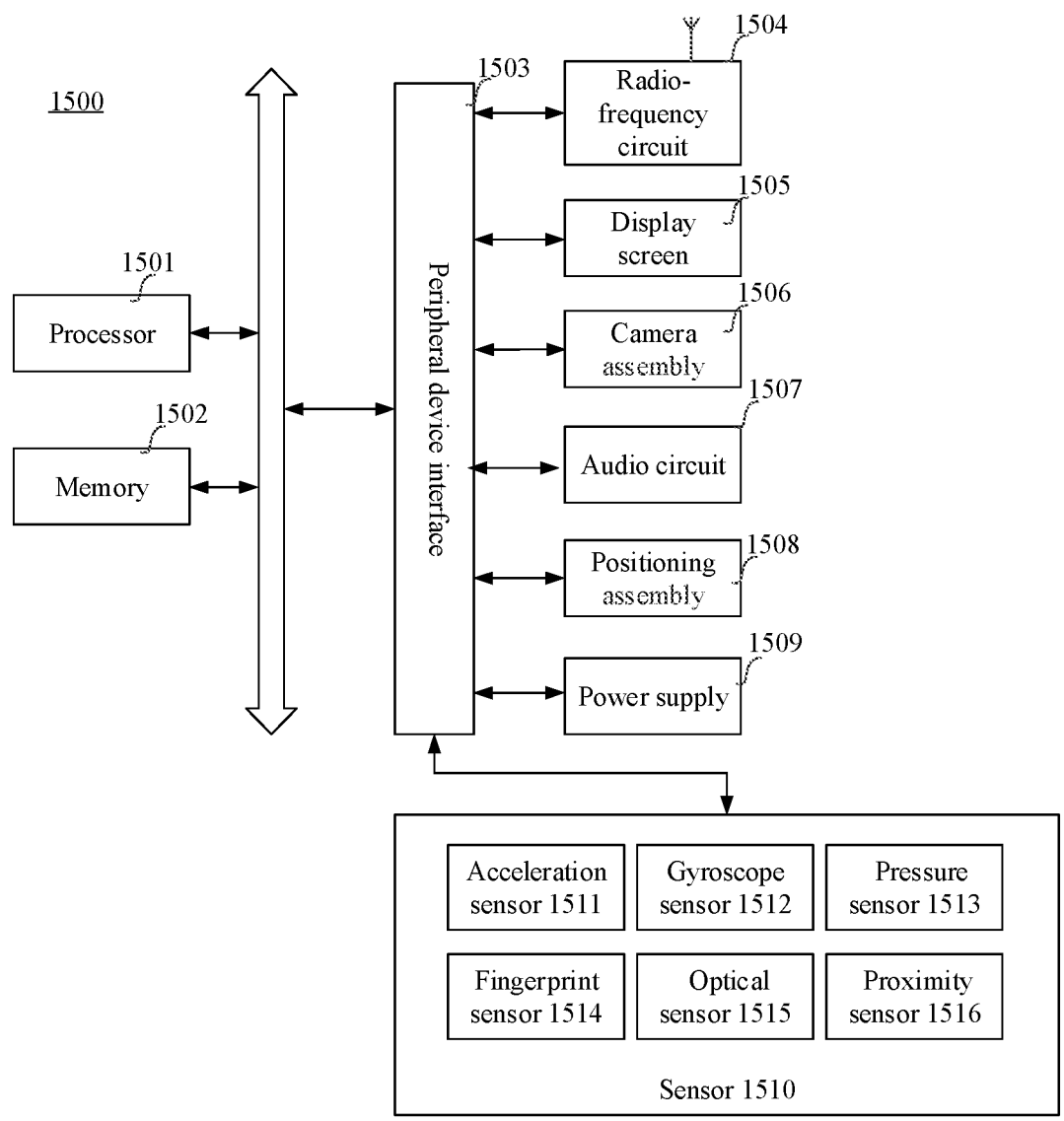
FIG. 15 is a structural block diagram of a terminal according to an embodiment of the present disclosure.

FIG. 15 illustrates a structural block diagram of a terminal 1500 according to an embodiment of the present disclosure. The terminal 1500 may be: a smart phone, a tablet computer, a moving picture experts group audio layer III (MP3) player, a moving picture experts group audio layer IV (MP4) player, laptop computer, or a desktop computer. The terminal 1500 may also be called a user device, a portable terminal, a laptop terminal, a desktop terminal and other names.

In general, the device 1500 typically includes: a processor 1501 and a memory 1502.

The processor 1501 may include one or more processing cores, such as a 4-core processor and an 8-core processor. The processor 1501 may be implemented by at least one of hardware forms including a digital signal processor (DSP), a field-programmable gate array (FPGA), and a programmable logic array (PLA). The processor 1501 may further include a main processor and a co-processor. The main processor, also called a CPU, is a processor configured to process data in an awake state; and the co-processor is a low-power-consumption processor configured to process data in a standby state. In some embodiments, the processor 1501 may be integrated with a graphics processing unit (GPU) responsible for rendering and drawing a content that needs to be displayed on a display screen. In some embodiments, the processor 1501 may further include an artificial intelligence (AI) processor configured to process computing operations related to machine learning.

The memory 1502 may include one or more computer-readable storage media (which may be non-transient storage media), which may be non-transitory. The memory 1502 may further include a high-speed random-access memory, and a non-volatile memory, such as one or more magnetic-disk storage devices and flash storage devices. In some embodiments, the non-transitory computer-readable storage medium in the memory 1502 is configured to store at least one instruction. The at least one instruction, when loaded and executed by the processor 1501, causes the processor 1501 to perform the method for implementing the video conference according to the method embodiments in the present disclosure.

In some embodiments, the terminal 1500 may further include: a peripheral device interface 1503 and at least one peripheral device. The processor 1501, the memory 1502, and the peripheral device interface 1503 may be connected with one another via buses or signal lines. Each peripheral device may be connected to the peripheral device interface 1503 via a bus, a signal line or a circuit board. Specifically, the peripheral device includes at least one of a radio-frequency circuit 1504, a touch display screen 1505, a camera 1506, an audio circuit 1507, a positioning assembly 1508, and a power supply 1509.

The peripheral device interface 1503 may be configured to connect at least one peripheral device associated with input/output (I/O) to the processor 1501 and the memory 1502. In some embodiments, the processor 1501, the memory 1502 and the peripheral device interface 1503 are integrated on the same chip or circuit board; and in sonic other embodiments, any one or two of the processor 1501, the memory 1502 and the peripheral device interface 1503 may be implemented on a separate chip or circuit board, which is not limited in this embodiment.

The radio-frequency circuit 1504 is configured to receive and transmit radio frequency (RF) signals which are also referred to as electromagnetic signals. The radio-frequency circuit 1504 communicates with a communication network and other communication devices via the electromagnetic signals. The radio-frequency circuit 1504 converts electrical signals into electromagnetic signals for transmission, or converts received electromagnetic signals into electrical signals. Optionally, the radio-frequency circuit 1504 includes: an antenna system, an RF transceiver, one or more amplifiers, a tuner, an oscillator, a digital signal processor, a codec chipset, a user identity module card, or the like. The radio-frequency circuit 1504 may communicate with other terminals over at least one wireless communication protocol. The wireless communication protocol includes but is not limited to: a world wide web, a metropolitan area network, intranet, various generations of mobile communication networks (2G, 3G, 4G, and 5G), a wireless local area network and/or a wireless fidelity (Wi-Fi) network. In some embodiments, the radio-frequency circuit 1504 may further include a circuit associated with near-field communication (NFC), which is not limited in the present disclosure.

The display screen 1505 is configured to display a user interface (UI). The UI may include graphics, text, icons, videos, and any combination thereof. When the display screen 1505 is a touch display screen, the display screen 1505 is further capable of acquiring a touch signal on or above a surface of the display screen 1505. The touch signal may be input, as a control signal, into the processor 1501 to be processed. Here, the display screen 1505 may be further configured to provide virtual buttons and/or a virtual keyboard, which is/are also referred to as soft buttons and/or a soft keyboard. In some embodiments, there may be one display screen 1505, which is disposed on a front panel of the terminal 1500; in other embodiments, there may be at least two display screens 1505, Which are respectively disposed on different surfaces of the terminal 1500 or designed in a folded fashion; and in still other embodiments, the display screen 1505 may be a flexible display screen, which is disposed on a curved surface or collapsible plane of the terminal 1500. The display screen 1505 may also be disposed in a non-rectangular irregular pattern, that is, a special-shaped screen. The display screen 1505 may be made of materials such as a liquid crystal display (LCD) and an organic light-emitting diode (OLED), The camera assembly 1506 is configured to capture images or videos. Optionally, the camera assembly 1506 includes a front camera and a rear camera. In general, the front camera is disposed on a front panel of the terminal, and the rear camera is disposed on the back of the terminal. In some embodiments, there are at least two rear cameras, each of which is at least one of a main camera, a depth-of-field camera, a wide-angle camera, and a telephoto camera, so as to achieve a bokeh effect by fusing the main camera and the depth-of-field camera, to achieve panoramic shooting and virtual reality (VR) shooting effects by fusing the main camera and the wide-angle camera, and other fusion-based shooting effect. In some embodiments, the camera assembly 1506 may further include a flashlight. The flashlight may be a monochromatic-temperature flashlight or a dichromatic-temperature flashlight. The dichromatic-temperature flashlight refers to a combination of a warm-light flashlight and a cold-light flashlight, and may serve to compensate light at different chromatic-temperatures.

The audio circuit 1507 may include a microphone and a speaker. The microphone is configured to acquire sound waves from a user and the environment, and convert the sound waves into electrical signals, which are input to the processor 1501 to be processed, or input to the radio-frequency circuit 1504 to enable voice communication. For the purposes of stereo acquisition or noise reduction, a plurality of microphones may be provided, and disposed on different parts of terminal 1500, respectively. The microphone may also be an array microphone or an omnidirectional acquisition type microphone. The speaker is configured to convert the electrical signals from the processor 1501 or the radio-frequency circuit 1504 into sound waves. The speaker may be a traditional thin-film speaker or a piezoelectric ceramic speaker. The speaker in the case of the piezoelectric ceramic speaker is capable of converting the electrical signals into sound waves audible to human beings, and converting the electrical signals into sound waves inaudible to human beings for distance measurement and other purposes. In some embodiments, the audio circuit 1507 may also include a headphone jack.

The positioning assembly 1508 is configured to position a current geographic location of the terminal 1500 to implement navigation or location-based service (LBS). The positioning assembly 1580 may be the United States' Global Positioning System (GPS), China's BeiDou Navigation Satellite System (BDS), and Russia's Global Navigation Satellite System (GLONASS).

The power supply 1509 is configured to supply power to respective components in the terminal 1500. The power supply 1509 may be alternating-current power, direct-current power, a disposable battery, or a rechargeable battery. When the power supply 1509 includes the rechargeable battery, the rechargeable battery may be a wired or wireless rechargeable battery. The wired rechargeable battery is a battery charged through a wired line, and the wireless rechargeable battery is a battery charged through a wireless coil. The rechargeable battery may be further configured to support the quick charge technology.

In some embodiments, the terminal 1500 may further include one or more sensors 1510. The one or more sensors 1510 include, but is not limited to, an acceleration sensor 1511, a gyroscope sensor 1512, a pressure sensor 1513, a fingerprint sensor 1514, an optical sensor 1515, and a proximity sensor 1516.

The acceleration sensor 1511 may detect the magnitudes of accelerations on three coordinate axes of a coordinate system that is established based on the terminal 1500. For instance, the acceleration sensor 1511 may be configured to detect components of gravitational acceleration on three coordinate axes. The processor 1501 may control a touch screen 1505 to display a user interface in a horizontal view or a vertical view based on a gravity acceleration signal captured by the acceleration sensor 1511. The acceleration sensor 1511 may be further configured to capture motion data of a game or a user.

The gyroscope sensor 1512 may detect a body direction and a rotation angle of the terminal 1500, and may capture 3D motions of a user on the terminal 1500 in cooperation with the acceleration sensor 1511. The processor 1501 may implement the following functions based on data acquired by the gyroscope sensor 1512: motion sensing (for example, changing the UI based on a tilt operation of a user), image stabilization during shooting, game control, and inertial navigation.

The pressure sensor 1513 may be disposed on a side frame of the terminal 1500 and/or at a lower layer of the touch display screen 1505. When the pressure sensor 1513 is disposed on the side frame of the terminal 1500, a holding signal of a user for the terminal 1500 may be detected, and the processor 1501 performs left- and right-hand recognition or quick operation based on the holding signal acquired by the pressure sensor 1513. When the pressure sensor 1513 is disposed at the lower layer of the touch display screen 1505, the processor 1501 controls operable controls on the UI according to a pressure operation of the user on the touch display screen 1505. The operable controls include at least one of a button control, a scroll bar control, an icon control, and a menu control.

The fingerprint sensor 1514 is configured to acquire a fingerprint of a user. The processor 1501 recognizes an identity of the user based on the fingerprint acquired by the fingerprint sensor 1514, or the fingerprint sensor 1514 recognizes the identity of the user based on the acquired fingerprint. When the identity of the user is recognized as a trusted identity, the processor 1501 authorizes the user to perform relevant sensitive operations, which include: unlocking the display screen, viewing encrypted information, downloading software, paying, changing settings, or the like. The fingerprint sensor 1514 may be disposed on a front, back or side of the terminal 1500. When a physical button or a manufacturer logo is disposed on the terminal 1500, the fingerprint sensor 1514 may be integrated with the physical button or the manufacturer logo.

The optical sensor 1515 is configured to acquire the intensity of ambient light. In an embodiment, the processor 1501 may control a display brightness of the touch display screen 1505 based on the intensity of ambient light acquired by the optical sensor 1515. Specifically, when the intensity of ambient light is high, the display brightness of the touch display screen 1505 is increased; and when the intensity of ambient light is low, the display brightness of the touch display screen 1505 is decreased. In another embodiment, the processor 1501 may also dynamically adjust shooting parameters of a camera assembly 1506 based on the intensity of ambient light acquired by the optical sensor 1515.

The proximity sensor 1516, also called a distance sensor, is typically disposed on the front panel of the terminal 1500. The proximity sensor 1516 is configured to acquire a distance between a user and the front of the terminal 1500. In an embodiment, when the proximity sensor 1516 detects that the distance between the user and the front of the terminal 1500 gradually decreases, the processor 1501 controls the touch display screen 1505 to switch from an on state to an off state; and when the proximity sensor 1516 detects the distance between the user and the front of the terminal 1500 gradually increases, the processor 1501 controls the touch display screen 1505 to switch from the off state to the on state.

Persons of ordinary skill in the art may understand that the terminal 1500 is limited by the structure illustrated in FIG. 15, and may include more or fewer components than those illustrated, or a combination of certain components, or have components arranged in a different fashion.

The term "at least one of A and B" in the present disclosure is merely to describe an association relationship between associated objects, indicating the possibility of three types of relationships. For example, at least one of A and B may indicate the following three cases: A exists alone, A and B exist concurrently, or B exists alone. Likewise, "at least one of A, B, and C" means that seven types of relationships may exist, which may indicate the following seven cases: A exists alone, B exists C exists alone, A and B exist concurrently, A and C exist concurrently, and C and B exist concurrently, and A, B and C exist concurrently. Likewise, "at least one of A, B, C, and D" means that fifteen types of relationships may exist, which may indicate the following fifteen cases: A exists alone, B exists alone, C exists alone, D exists alone, A and B exist concurrently, A and C exist concurrently, A and D exist concurrently, C and B exist concurrently, D and B exist concurrently, C and D exist concurrently, A, B and C exist concurrently, A, B and D exist concurrently, A, C and D exist concurrently, B, C, and D exist concurrently, and A, B, C, and D exist concurrently.

In the present disclosure, the terms "first" and "second" are merely for a descriptive purpose, and are not to be construed as indicating or implying relative importance. The term "a plurality of" refers to two or more, unless otherwise specifically defined.

In the several embodiments provided by the present disclosure, it should be understood that the disclosed apparatuses and methods may be implemented in other manners. For example, the apparatus embodiments described above are merely illustrative. For example, the division of a unit only indicates a logically functional division. There may be other divisions in actual implementation. For example, a plurality of units or components may be combined or may be integrated into another system, or some features may be ignored or not executed. For another point, the mutual coupling or direct coupling or communication connection as illustrated or discussed may be indirect coupling or communication connection enabled via some interfaces, apparatuses or units, and may be in electrical, mechanical or other forms.

A unit described as a discrete component may be or may be not physically separated, and a component displayed as a unit may be or may be not a physical unit, and may be located in one place, or distributed over a plurality of network units. The objects of the solutions of the embodiments may be achieved by selecting some or all of the units according to actual needs.

Persons of ordinary skill in the art may understand that all or some of the steps described in the embodiments described above may be accomplished through hardware, or through relevant hardware instructed by a program stored in a computer-readable storage medium, which may be a read-only memory, a magnetic disk, or an optical disk, or the like.

Described above are merely optional embodiments of the present disclosure, but are not intended to limit the present disclosure. Any modifications, equivalent replacements, improvements and the like made within the spirit and principles of the present disclosure should be included within the scope of protection of the present disclosure.

What is claimed is:

1. A method for implementing a video conference, comprising:
    acquiring layout information of a conference picture of the video conference, wherein the layout information comprises: information of at least two conferee regions in the conference picture, and information of corresponding relationships between the at least two conferee regions and at least two terminals involved in the video conference;
    sending the information of the corresponding conferee regions to the at least two terminals;
    receiving conferee multimedia data provided by the at least two terminals based on the information of the corresponding conferee regions;
    acquiring conference video data based on the conferee multimedia data; and sending the conference video data to the at least two terminals;
wherein acquiring the layout information of the conference picture of the video conference comprises:
receiving the layout information sent by a master control terminal of the at least two terminals.

2. The method according to claim 1, wherein upon receiving the layout information sent by the master control terminal, the method further comprises:
determining, in the case that a master control instruction designates a first terminal of the at least two terminals as the master control terminal, the first terminal as the master control terminal.

3. The method according to claim 2, wherein the master control instruction comprises at least one of: a speech instruction to be triggered by the first terminal, a master-control switch instruction to be triggered by the first terminal, and a master-control switch instruction to be triggered by a master control terminal prior to a current time.

4. The method according to claim 2, wherein sending the information of the corresponding conferee regions to the at least two terminals comprises:
receiving layout application information sent by a second terminal of the at least two terminals; and
sending, based on the layout application information, the information of the conferee region corresponding to the second terminal to the second terminal.

5. The method according to claim 1, wherein acquiring the conference video data based on the conferee multimedia data comprises:
acquiring, in the case that the conferee multimedia data comprises shared video data, the conference video data by processing the shared video data based on the layout information, wherein in the conference video data, a region occupied by the shared video data is larger than a region occupied by other conferee multimedia data except the shared video data.

6. The method according to claim 1, wherein upon acquiring the conference video data based on the conferee multimedia data, the method further comprises:
presenting the conference video data on a display screen.

7. The method according to claim 1, wherein sending the conference video data to the at least two terminals comprises:
receiving layout adjustment information sent by a second terminal of the at least two terminals;
adjusting the conference video data based on the layout adjustment information; and
sending the adjusted conference video data to the second terminal.

8. A method for implementing a video conference, comprising:
sending, by a master control terminal of at least two terminals, layout information of a conference picture to a conference apparatus, wherein the layout information comprises information of at least two conferee regions in the conference picture, and information of corresponding relationships between the at least two conferee regions and at least two terminals involved in the video conference;
acquiring information of conferee regions corresponding to terminals provided by the conference apparatus;
acquiring multimedia data;
acquiring conferee multimedia data which is provided by the terminals based on the information of the corresponding conferee regions, based on the information of the conferee regions and the multimedia data;
providing the conferee multimedia data to the conference apparatus;
receiving conference video data provided by the conference apparatus; and
presenting the conference video data.

9. The method according to claim 8, wherein acquiring the conferee multimedia data based on the information of the conferee regions and the multimedia data comprises:
determining regions where persons in the multimedia data are located by performing person recognition on the multimedia data; and
acquiring the conferee multimedia data by processing the multimedia data based on the information of the conferee regions and the regions where the persons are located, wherein in the conferee multimedia data, a proportion of the regions where the persons are located is greater than a specified value.

10. The method according to claim 8, wherein acquiring the information of the conferee regions corresponding to the terminals provided by the conference apparatus comprises:
sending layout application information to the conference apparatus; and
receiving the information, fed back by the conference apparatus, of the conferee regions corresponding to the terminals.

11. The method according to claim 8, wherein receiving the conference video data provided by the conference apparatus comprises:
sending layout adjustment information to the conference apparatus; and
receiving conference video data adjusted by the conference apparatus based on the layout adjustment information.

12. The method according to claim 8, wherein presenting the conference video data comprises:
receiving an adjustment instruction; and
presenting the conference video data adjusted based on the adjustment instruction.

13. A system for implementing a video conference, comprising a conference apparatus and at least two terminals; wherein
a master control terminal of the at least two terminals sends layout information of a conference picture to the conference apparatus;
the conference apparatus is configured to acquire layout information of a conference picture of the video conference, wherein the layout information comprises information of at least two conferee regions in the conference picture, and information of corresponding relationships between the at least two conferee regions and at least two terminals involved in the video conference;
the conference apparatus is configured to send the information of the corresponding conferee regions to the at least two terminals;
the terminals are configured to acquire multimedia data;
the terminals are configured to acquire conferee multimedia data based on the information of the corresponding conferee regions and the multimedia data;
the terminals are configured to provide the conferee multimedia data to the conference apparatus;
the conference apparatus is configured to acquire conference video data based on the conferee multimedia data;
the conference apparatus is configured to send the conference video data to the at least two terminals; and
the terminals are configured to present the conference video data.

14. The system according to claim 13, wherein
the conference apparatus is configured to present the conference video data on a display screen;
a second terminal of the at least two terminals is configured to send layout adjustment information to the conference apparatus;
the conference apparatus is configured to send the conference video data to a first terminal of the at least two terminals, and send a conference video data adjusted based on the layout adjustment information to the second terminal; and
the first terminal is configured to present the conference video data, and the second terminal is configured to present the adjusted conference video data.

15. A conference apparatus, comprising a processor and a memory storing therein at least one instruction, at least one program, a code set, or an instruction set; wherein
the processor, when loading and executing the at least one instruction, the at least one program, the code set, or the instruction set, is caused to perform the method for implementing the video conference as defined in claim 1.

16. A terminal, comprising a processor and a memory storing therein at least one instruction, at least one program, a code set, or an instruction set; wherein
the processor, when loading and executing the at least one instruction, the at least one program, the code set, or the instruction set, is caused to perform the method for implementing the video conference as defined in claim 8.

17. A computer non-transitory storage medium storing therein at least one instruction, at least one program, a code set, or an instruction set; wherein the at least one instruction, the at least one program, the code set, or the instruction set, when loaded and executed by a processor of a computer device, causes the computer device to perform the method for implementing the video conference as defined in claim 1.

18. A computer non-transitory storage medium storing therein at least one instruction, at least one program, a code set, or an instruction set; wherein the at least one instruction, the at least one program, the code set, or the instruction set, when loaded and executed by a processor of a computer device, causes the computer device to perform the method for implementing the video conference as defined in claim 8.

* * * * *

UNITED STATES PATENT AND TRADEMARK OFFICE
CERTIFICATE OF CORRECTION

| | | |
|---|---|---|
| PATENT NO. | : 12,167,160 B2 | Page 1 of 1 |
| APPLICATION NO. | : 17/615881 | |
| DATED | : December 10, 2024 | |
| INVENTOR(S) | : Lirong Xu et al. | |

It is certified that error appears in the above-identified patent and that said Letters Patent is hereby corrected as shown below:

On the Title Page

The Assignee field should appear as:
(73) Assignee: BEIJING BOE TECHNOLOGY DEVELOPMENT CO., LTD., Beijing (CN)

Signed and Sealed this
Fifth Day of August, 2025

Coke Morgan Stewart
*Acting Director of the United States Patent and Trademark Office*